United States Patent Office 3,451,782
Patented June 24, 1969

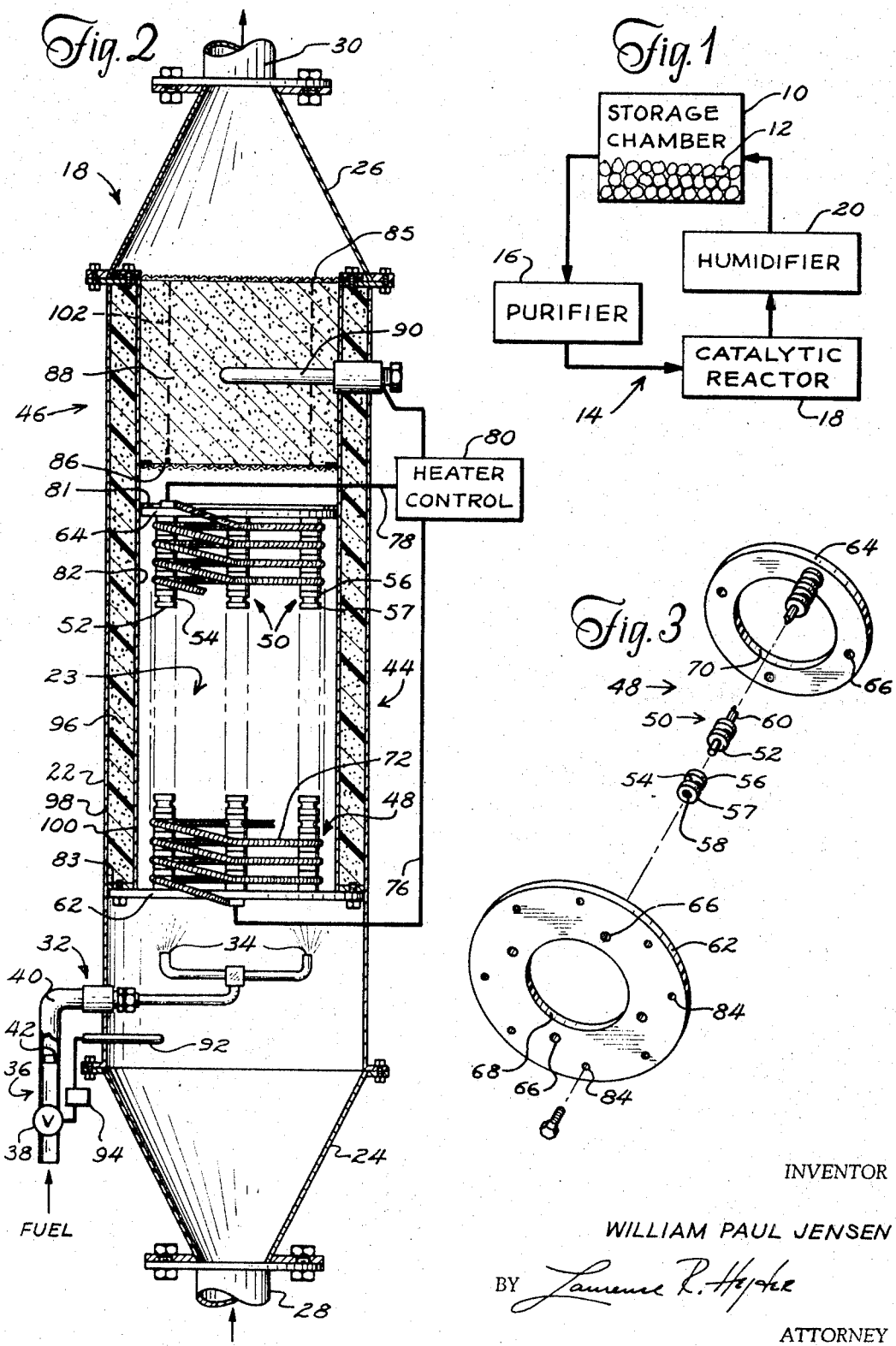

3,451,782
CATALYTIC REACTOR
William Paul Jensen, Springfield, Va., assignor to The Susquehanna Corporation, a corporation of Delaware
Filed May 14, 1965, Ser. No. 455,768
Int. Cl. B01j 7/00, 9/00
U.S. Cl. 23—281                      1 Claim

ABSTRACT OF THE DISCLOSURE

A catalytic reactor comprising a housing containing a bed of catalytic material, a gas inlet at the lower end thereof and an outlet at the upper end thereof. Oxygen-containing gas enters the housing at the lower end and is intermixed with an oxygen-combustible fuel, the flow rate of which is controlled to be less than the stoichiometric quantity corresponding to the available oxygen. Electrical heating elements are provided to preheat the gas-fuel mixture to a predetermined temperature prior to its passage through the bed of catalytic material. In order to control the energy input during preheating, a temperature-sensing means is inserted in the bed of catalytic material, and through suitable control means, varies the degree of gas-fuel mixture preheat.

---

This invention relates to an improved gas generator and, more particularly, to an improved catalytic reactor for reducing the oxygen content of a gas in a process involving complete combustion of an oxygen-combustible fuel.

The solution of the problem of storing perishable or oxidizable foods, such as animal or plant matter, for extended periods of time with limited physiological and microbiological deterioration has long been unsatisfied. It is well-known that both animal and plant matter, after being separated from their parent source, will continue their respiratory activities whereby oxygen is assimilated from the surrounding atmosphere and carbon dioxide and water vapor are emitted. The reduction in available oxygen in the surrounding atmosphere retards or, in the event of complete elimination, terminates the respiratory activities of the stored matter. Complete elimination of oxygen from the storage atmosphere is to be avoided since termination of the respiratory process is undesirable if "freshness" is to be retained.

Recent studies have indicated that the presence of a high concentration of carbon dioxide, which will similarly retard the respiratory activities of the stored matter, is undesirable because it induces changes in the structure of the stored matter into a fibrous state. while still remaining usable, this often results in an undesirable product since the texture or taste of the stored matter will vary from that of the natural state. It has also been found that the elimination of carbon dioxide from the storage chamber increases the shelf life of the stored matter considerably. Therefore, it is apparent that the most desirable storage atmosphere contains a quantity of oxygen less than that normally found in air, for example, in the range of 2–5%, together with water vapor and inert gases normally found in air. This has led to a new class of apparatus for preserving animal and plant matter which accelerates oxygen removal by the use of a combustion means or burner, rather than relying upon the normal respiration of the stored matter to deplete the available oxygen. The combustion process is designed to ensure complete combustion of the fuel and the gaseous combustion products are then purified whereby carbon dioxide is removed and the resulting atmosphere, which is used for storing foods, consists primarily of nitrogen, water vapor, and traces of inert gases.

To efficiently reduce the oxygen content in a food storage system, it has been found that a closed system is desirable whereby the storage atmosphere within a storage chamber is circulated through gas generating and purifying means and recirulated back into the storage chamber. Because of this closed-system approach, the oxygen content in the storage atmosphere after operation for a period of time is less than that found in normal atmospheric air and, therefore, vitiated air is admitted to the gas generator which is in the form of a combustion means. When the oxygen content is reduced below a particular amount, the amount being dependent upon the fuel with which it is combined, there is insufficient oxygen available to support flame combustion unless the vitiated air mixed with fuel is preheated sufficiently that the preheat plus the heat due to combustion would cause the reaction products to have a temperature corresponding to the adiabatic flame temperature of a fuel-air mixture, at normal atmospheric temperatures, having the minimum oxygen quantity which would support flame burning. As the oxygen level decreases the temperature to which the fuel-air mixture must be raised prior to the combustion zone increases, adding the danger of explosion to the burning process and reducing the economic efficiency of the system.

Substitution of a catalytic reactor for a flame burner permits oxidation of the fuel at a significantly lower temperature than is required with a flame burner since the only temperature requirement is that the catalytic material be maintained above a minimum temperature at which its activity is efficient. As the available oxygen decreases, the fuel-air mixture can be preheated to temperatures far below the lean flammability limit thus avoiding the possibility of explosion and yet sufficiently high to ensure efficient conversion of the oxygen to carbon dioxide. In order to avoid feeding undersirable unburned fuel into the storage chamber, it is necessary to ensure complete combustion of the fuel. This is accomplished by providing a fuel quantity which is exactly equal to or preferably less than the stoichiometric fuel quantity corresponding to the available oxygen.

Accordingly, it is one object of this invention to safely generate a relatively low temperature gas having the desired components.

It is another object of this invention to safely reduce the oxygen content in vitiated air and maintain the products of combustion at a reltaively low temperature.

A still further object of this invention is to provide a gas generator which efficiently reduces the oxygen level in a gas whose oxygen content varies over a relatively wide range.

Other objects and attendant advantages will be further understood from the following description and drawings.

Briefly stated, this invention, in one form, comprises a vertically aligned catalytic reactor having an elongated tubular housing including a gas inlet at a lower end thereof and an outlet port at the upper end thereof. Oxygen-containing gas enters the housing at the lower end and is intermixed with an oxygen-combustible fuel admitted to the housing at a point adjacent the gas inlet. The fuel flow rate is controlled to be less than the stoichiometric quantity corresponding to the available oxygen. The gas-fuel mixture proceeds upwardly and passes over electrical heating elements which preheat the mixture to a predetermined temperature. Adjacent the uppermost end of the housing is a bed of catalytic material through which the mixture flows. The catalyst bed is maintained above a predetermined minimum temperature level in order to be sufficiently reactive for efficient operation of the catalytic reactor. The catalytic material is maintained at or above the desired temperature level by a combination of the heat of reaction produced during oxidation of the fuel and the heat added to the mixture prior to entering the catalyst bed. In order to control the energy input during preheating a temperature-sensing means is inserted within the catalyst bed and, through suitable control means, varies the degree of gas-fuel mixture preheat. The rate of flow of the mixture is controlled such that it flows turbulently through the catalyst bed in order to maximize the catalytic reactors efficiency. The combustion products, comprising oxygen, carbon dioxide, nitrogen, water vapor and traces of inert gases, then flow outwardly through the outlet port at the top of the catalytic reactor.

This invention will be better understood from the following detailed description and the following drawing in which:

FIGURE 1 is a flow diagram of a process of the type in which the catalytic reactor of this invention is intended to be used, FIGURE 2 is a sectional view of a catalytic reactor formed in accordance with this invention, and FIGURE 3 is an exploded view of a portion of an electrical heater employed in the catalytic reactor of FIGURE 2.

Adverting now to the drawing, and more particularly to FIGURE 1, there is shown a typical system of the type in which the gas generator or catalytic reactor of this invention can be employed. Obviously, this system should not be considered limiting as to the possible applications of the gas generator but the system is shown merely to exemplify one possible use, The system shown comprises a storage chamber 10 for storing food products 12, such as fruit or meat. When the food products 12 are first loaded into the storage chamber 10, the atmosphere within the chamber is essentially normal atmosphere consisting of approximately 21% oxygen, 79% nitrogen, .04% carbon dioxide, water vapor and traces of inert gases. In order to reduce the oxygen content to a desired level of between 2 and 5% without increasing the carbon dioxide content above approximately 1.5%, the storage atmosphere is passed in a closed circuit through a purifying system 14. The system 14 includes a gas purifier 16 such as an adsorption device for selective removal of carbon dioxide, ethylene and other respiration products or impurities. The gas leaving the purifier 16 consists primarily of nitrogen, oxygen, and inert gases, and is then admitted to the gas generator or catalytic reactor 18 of this invention. The gas generator reduces the oxygen content and the combustion products are then passed to the storage chamber 10 through a humidifier 20 which both cools and humidifies the combustion products. The oxygen level in the combustion products is not necessarily equal to the final desired level since continued recirculation of the storage atmosphere permits rapid reduction to the desired level.

After the system 14 has been operating for a reasonably short period, the oxygen level in the storage atmosphere is reduced below the normal level and, therefore, the oxygen entering the gas generator 18 is below that of normal atmospheric air. The gas generator of this invention will continue to remove the oxygen even though the oxygen content is considerably lower than normal until the oxygen and carbon dioxide content of the storage atmosphere is at the desired level.

Referring now to FIGURE 2, there is shown a sectional view of the gas generator or catalytic reactor 18 of this invention. The catalytic reactor 18 comprises a container or housing 22 defining a chamber 23 of substantially cylindrical form and vertically oriented. A pair of transition members 24, 26 are provided at the lowermost and uppermost ends, respectively, of the housing 22 to facilitate making suitable connections to inlet piping 28 and outlet piping 30, respectively. By designating the lowermost end as the inlet end and the uppermost end as the outlet end, it is obvious that the flow of gas through the chamber 23 is in a vertically upwardly direction.

As the air enters the chamber through the inlet transition member 24, it is intermixed with an oxygen-combustible fuel which is fed into the chamber through fuel-feeding means 32. The fuel is preferably introduced into the air stream in the form of a gas to facilitate complete and uniform intermixing therewith. Fuels, such as hydrogen, alkanes of up to 5 carbon atoms and mixtures thereof, can be employed. Propane is the preferred fuel since it is inexpensive and most easily handled; however, other liquefied petroleum gases (LPG) and fuels such as natural gas and water gas have been found to be suitable. The fuel-feeding means 32 may be of any standard form, and includes a plurality of fuel outlet ports 34 through which the fuel is ejected into the chamber 23. Since it is usually desirable to maintain some oxygen in the catalytic reactor effluent and in order to ensure complete combustion of the fuel, the fuel is admitted in a predetermined quantity which is less than the stoichiometric fuel quantity corresponding to the particular oxygen content of the incoming air. Additionally, by providing a less than stoichiometric quantity of fuel, the operation of the reactor is considerably safer than if operated with the stoichiometric quantity because the tendency to flash or explode is minimized. To ensure the safety of operation of the reactor at all times, a redundant fuel-control means 36 is employed. The fuel-control means 36 includes a conventional fuel-control valve 38 which permits variation of the fuel flow through the conduit 40, and a fixed orifice 42 in series with the fuel-control valve 38 which limits the maximum fuel flow through the conduit 40. The fuel-control valve 38 may be manually controlled or automatically controlled as described below.

The fuel-air mixture flows upwardly through a preheating section 44 wherein the fuel-air mixture is preheated above a predetermined temperature defined by conditions in the combustion section 46 downstream of the preheating section 44. The heating is accomplished by means of an open element type electric heater 48. The electric heater 48 includes a plurality of tiers or columns 50 of electrical insulating spools 52, preferably of ceramicware. Four such columns are employed, only three of which are visible in FIGURE 2; however, any number can be used. The spools 52 are cylindrical insulating bodies each having a deep groove 54 which divides the cylindrical walls thereof into flanged portions 56, 57 which act as separator or spacer elements. As can be seen in FIGURE 3, each spool 52 is provided with an axial bore 58 for receiving a support rod 60 in sliding fit therethrough for assembly in a tier or column of insulating spools elongated to whatever desired length is needed. The rods 60 are supported at their ends by spaced-apart discs or plate-like brackets 62, 64 which are provided with rod-receiving holes 66 through which the rods 60 are inserted. The brackets 62, 64 are annular, or in other words, are provided with a large central orifice 68, 70, respectively, so as to provide a minimum of resistance to the flow of the fuel-air mixture therethrough. A helically coiled, electrical-resistant wire element 72, such as standard gage Nichrome, is wound about the columns 50 in a substantially helical manner from one bracket 62 to the other bracket 64 in such a manner that the element 72 is retained in a portion of each spool groove 54. Lead wires 76, 78 are provided at each end of the heater 48 for connection to a heater-control 80.

The heater assembly 48 is mounted inside the housing 22 by slipping it into the chamber 23 until one bracket, in this embodiment bracket 64, abuts an annular projection 81 provided on the inner wall surface 82 of the chamber 23. The other bracket 62 is then fixedly attached to the housing structure by any conventional means such as by bolting it to a support ring 83 through bolt holes 84 provided near the periphery of the bracket 62.

Downstream of the preheating section 44 of the reactor chamber 23 and adjacent to the outlet transition member 26, is located the reactor or combustion section 46. The combustion section 46 is defined on the vertically upper and lower ends thereof by foraminous members 85, 86, respectively, and on the sides by the housing 22 or, more specifically, the chamber inner wall surface 82. Contained within the combustion section 46 is a bed 88 of triturated catalytic material for promoting the rate of combustion of the fuel with the oxygen in the air. The members 85, 86 are sufficiently foraminous to minimize friction losses during the flow of the gas therethrough but sufficiently dense to retain the catalytic material in place. Many commercially available materials may serve as the catalyst, for example, platinum, iridium, or palladium, deposited on inert carriers such as aluminum oxide.

As was indicated earlier, the catalytic reactor 18 is vertically oriented and the flow stream is vertically upwardly. The primary advantage of such orientation is to avoid compaction of the powdered or granular catalyst material in a manner which would cause unequal distribution of the catalyst throughout the cross-section of the bed 88 thereby producing channels of lesser resistance to fluid flow. By orienting the reactor 18 vertically and having the flow through the bed 88 in a direction opposite to the direction of gravitational force, the tendency for channeling and for dense compaction of the catalyst is minimized.

The reaction of catalytic oxidation takes place on the surface of the catalyst. Fuel and oxygen molecules are initially adsorbed on the surface of and in the pores of the catalytic material on what are known as the active sites of these materials. The nature of the catalytic oxidation allows the reaction to proceed when the oxygen concentration is far below that of normal air and below that which would be required for the reaction to proceed in normal flame conversion. It, therefore, can be seen that the greater the contact of the oxygen and fuel molecules with the exposed surface of the catalyst material, the higher the efficiency and rate of reaction. In order to achieve this improved performance and optimized operation of the catalytic bed 88, the fuel-air mixture through the bed should be in the turbulent flow regime rather than the laminar flow regime. When laminar flow prevails, diffusion of the air and fuel molecules into and out of the pores of the catalyst can become the reaction rate controlling factor rather than the catalytic activity of the material itself. The criterion for establishing turbulent flow is Reynolds Number which is dependent upon the diameter of the channel through which the fluid is flowing, the velocity of the fluid and the kinematic viscosity of the fluid. It has been found that with a catalyst material having an average diameter of 0.125 inch, a fuel-air mixture having a temperature of between 600° and 800° F. would require a velocity above 250 feet per minute in order to provide the desired turbulent flow.

The effect of the catalytic material on the combustion of the fuel-air mixture is small until the catalytic material temperature is raised above its activation temperature level which is dependent upon the particular catalyst employed. For catalysts of the type referred to above, the activation temperature is approximately 500° F. When the oxygen concentration of the air is sufficiently below that normally found in air, or when the quantity of fuel is less than the stoichiometric quantity corresponding to the quantity of oxygen in the air, the heat generated by the reaction is insufficient to maintain the catalyst bed temperature at or above the activation temperature level. Additionally, even if the heat generated by the reaction is relatively high, the upstream portion of the bed 88 is subjected to the cold fuel-air mixture which reduces the temperature of the catalyst in the forward section of the bed. This reduces the activity of the forward portion thus reducing the heat generated in that region. Accordingly, ancillary heat is added to the system to maintain the required temperature throughout the entire bed. In the present embodiment, the additional heat is provided by means of the electric heater 48 which adds sufficient energy to the fuel-air mixture during the preheating step that when supplemented by the heat of reaction, the combustion products have a temperature sufficiently high to maintain the temperature of the catalytic bed above its activation level.

In order to ensure that the bed 88 is maintained at the desired temperature level it is necessary to sense the temperature of the catalytic material. Accordingly, a temperature-sensing means or thermocouple 90 is located within the catalyst bed 88 with the output of the thermocouple 90 fed to the heater control 80 for maintaining the output of the electric heater 48 at a level providing the required energy input into the fuel-air mixture. The heater control may be of any standard electrical or electro-mechanical type which, in response to the output of the thermocouple 90, energizes the heater 48 when the temperature of the bed 88 drops below a predetermined level.

As indicated earlier, the fuel control valve 38 can be manually or automatically controlled. The two controlling parameters upon which the fuel flow rate depends are the temperature of the catalytic material and the quantity of oxygen in the incoming air. To begin with, it is essential that the fuel not be fed into the chamber 23 before the catalytic material temperature is above the activation temperature level. Accordingly, only air is passed through the chamber 23 and heated by the electric heater 48 which subsequently heats the catalytic material until its temperature is above a predetermined value. When the catalytic material's temperature is above this predetermined value, the fuel valve 38 is opened either manually or by automatic means controlled by the output of the thermocouple 90, for example, by means of a solenoid actuator (not shown).

To ensure complete combustion of the fuel, the fuel flow rate is initially set at a value less than the stoichiometric fuel quantity corresponding to the oxygen content of the incoming air. In the system illustrated in FIGURE 1, the oxygen content of the air is initially equal to that found in normal air, i.e., 21%, and the fuel is equal to a stoichiometric quantity corresponding to air having 10-12% oxygen. As the system is operated, the oxygen content in the storage chamber 10 decreases and it is, therefore, necessary to decrease the fuel flow rate accordingly. For example, when the oxygen level approaches 12% the fuel quantity is reduced to a quantity corresponding to air having 6% oxygen. A conventional oxygen analyzer, schematically illustrated at 92, is inserted upstream of the fuel outlet ports 34 to sense the oxygen content of the incoming air. The output signal of the oxygen analyzer 92 is fed to a conventional valve control means 94, such as a solenoid, which, in turn, modifies the fuel flow through the fuel feed conduit 40. The fuel modification can be continuous or in a stepped manner. By controlling the fuel quantity to a value less than the stoichiometric quantity corresponding to the incoming oxygen content, the sysem is ensured that fuel does not form part of the effluent of the catalytic reactor 18. An additional advantage is the increased safety which is attained by operating with a fuel lean fuel-air mixture.

In order to minimize the required energy input through means of the heater 48 by reducing external heat losses and in order to improve the uniformity of temperature throughout the catalyst bed 88, the chamber 23 is provided with a layer of thermal insulation 96, such as magnesia. The insulation extends from the upstream end of the heater section 44 as defined by the bracket 62 to the downstream end of the combustion section 46, as defined by the screen 85. To provide for receipt of the insulation 96, the housing 22 is fabricated of concentric spaced-apart walls 98, 100 with the insulation placed between. If desired, the depth of insulation can be increased in the combustion section 46 by adding an additional inner wall 102 and placing insulation between it and the next adjacent wall 100.

Another method employed for minimizing heat loss and providing thermal stability, or high thermal inertia, to the bed 88 is to provide a deep bed of relatively large over-all mass.

The combustion products passing through the outlet transition member 26 include nitrogen, carbon dioxide, traces of inert gases and oxygen at a desired level below that admitted to the catalytic reactor 18. Because the reactor operates at relatively low temperatures as compared to flame burners, for example, at 900° F. for reactors as compared to 2,500° F. for flame burners, the temperature of the combustion products is also significantly lower.

While the embodiment illustrated in FIGURE 2 and discussed above teaches preheating the fuel-air mixture before it enters a combustion section 46, it should be noted that the supplemental energy could be added directly to the catalyst material by providing heating elements within the catalyst bed 88 itself (not shown). However, the preheating arrangement is preferred because it permits more ready accessibility to the heating elements for repair and maintenance, provides a more uniform distribution of heat throughout the cross-section of the reactor 18, and because heating elements embedded in the catalyst bed 88 would tend to abrade or corrode the catalyst due to the differences in thermal expansion experienced by the catalyst material and the heater elements.

It should also be noted that the temperature-sensing means or thermocouple 90 could be located downstream from the catalyst bed 88 rather than embedded within it as described above. When located downstream from the catalyst bed it is necessary to calibrate the temperature of the combustion products as a function of the catalyst bed temperature such that measurement of the combustion products' temperature can be used as a measure of the temperature of the catalyst bed.

It can be seen from the above discussion that the catalytic reactor provided by this invention is an inherently safe device which effectively reduces the oxygen content of a gas stream to any desired level. The reactor 18 is effective regardless of the oxygen content and works efficiently on vitiated air, therefore, making it particularly attractive in a closed, recirculating storage atmosphere generation system, such as illustrated in FIGURE 1. Additionally, the reactor effluent is of relatively low temperatures, thus minimizing the amount of refrigeration necessary to reduce the effluent temperature to a desired storage atmosphere, for example, 32-40° F. The construction of the reactor 18 of this invention facilitates maintenance and minimum of operation expenses as well as permitting substantially complete automatic control throughout the length of operation of the reactor.

While the above description pertains primarily to one specific embodiment, it is apparent to those skilled in the art that numerous changes, combinations and substitutions of equivalents might be made and still come within the true scope and spirit of this invention. For example, while a vertically oriented reactor having a cylindrical cross-section is a preferred form, this invention can be practiced in a horizontally oriented reactor having a rectangular cross-section.

What is claimed as new and desired to be secured by Letters Patent of the United States is:

1. A gas generator of the type in which oxygen-containing gas and fuel are catalytically reacted at relatively low temperatures to safely generate a desired gaseous effluent, said generator comprising:
   (a) a housing defining a chamber having an inlet for receiving said oxygen-containing gas and an outlet for exhausting said effluent, the oxygen content of said oxygen-containing gas varying during operation of said generator from an amount equal to that found in normal atmospheric air to an amount less than that found in normal atmospheric air,
   (b) fuel-feeding and fuel-control means for supplying a predetermined quantity of oxygen-combustible fuel into said chamber and forming a mixture of said fuel and said oxygen-containing gas, said predetermied quantity being less than the stoichiometric fuel quantity corresponding to said oxygen content, said fuel-feeding and control means comprising flow-control valve means and a fixed orifice in series with said valve means, said fixed orifice limiting the maximum quantity of fuel flow into said chamber,
   (c) a bed of catalytic material within said chamber through which said mixture flows, said material promoting the rate of combustion of said oxygen and said fuel,
   (d) heating means for heating said catalytic material and maintaining the temperature of said catalytic material above a predetermined value,
   (e) temperature-sensing means having an output responsive to the temperature of said catalytic material,
   (f) temperature-control means for varying the output of said heating means in response to the output of said sensing means, and
   (g) an oxygen analyzer in working relationship with the oxygen-containing gas and said valve-control means, said valve-control means being responsive to the output of said analyzer.

References Cited

UNITED STATES PATENTS

| | | | |
|---|---|---|---|
| 2,391,327 | 12/1945 | Mekler | 252—419 |
| 3,159,450 | 12/1964 | Asker et al. | 23—1 |
| 3,166,381 | 1/1965 | Loss | 23—288 |
| 3,313,630 | 4/1967 | Harvey | 23—281 |
| 2,533,945 | 12/1950 | Legatski | 23—288 |

FOREIGN PATENTS 554,691  7/1943  Great Britain.

JAMES H. TAYMAN, Jr., Primary Examiner.

U.S. Cl. X.R.

21—58; 23—288, 1; 99—189; 236—15; 252—372; 431—18